Feb. 24, 1925.

S. M. MAGSBY

TRAP

Filed Jan. 19, 1924   2 Sheets-Sheet 1

1,527,892

S. M. Magsby
INVENTOR

BY Victor J. Evans
ATTORNEY

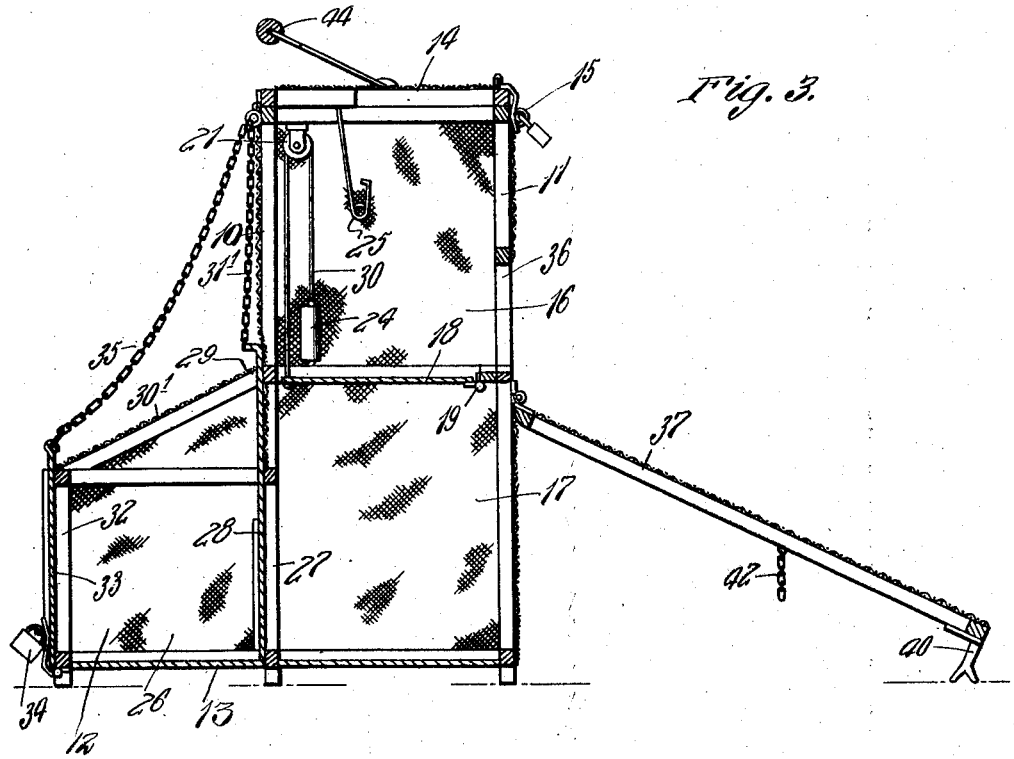
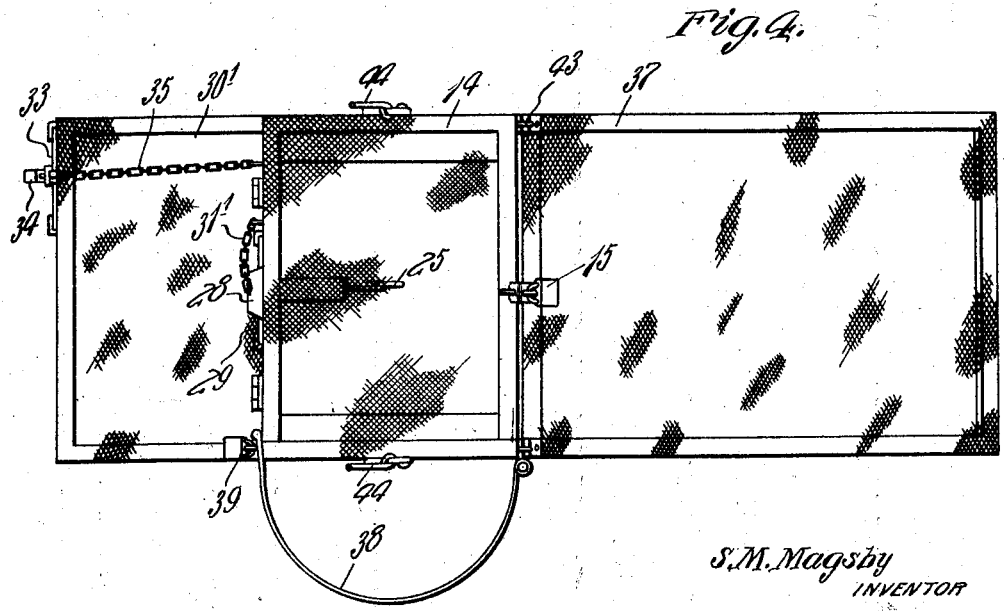

Patented Feb. 24, 1925.

1,527,892

UNITED STATES PATENT OFFICE.

STEPHEN M. MAGSBY, OF LULA, MISSISSIPPI, ASSIGNOR OF ONE-HALF TO THOMAS C. CRAWFORD, OF LULA, MISSISSIPPI.

TRAP.

Application filed January 19, 1924. Serial No. 687,308.

*To all whom it may concern:*

Be it known that I, STEPHEN M. MAGSBY, a citizen of the United States, residing at Lula, in the county of Coahoma and State of Mississippi, have invented new and useful Improvements in Traps, of which the following is a specification.

This invention contemplates the provision of an animal trap designed to automatically reset itself after each operation, and embodying a plurality of separate compartments, through which an animal passes until it reaches the final compartment in which it is trapped, the latter mentioned compartment having a door so that the animal can be removed from the compartment when desired.

In carrying out the invention, I provide a trap of the above mentioned character provided with means for associating the trap with a tree or other suitable support, the trap further including a runway which can be arranged at the proper inclination with the ground, and arranged in parallelism with one wall of the trap when the latter is not in use, the runway being pivotally mounted upon the trap for this purpose.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 3 is a vertical sectional view through the trap.

Figure 4 is a top plan view.

Figure 1:
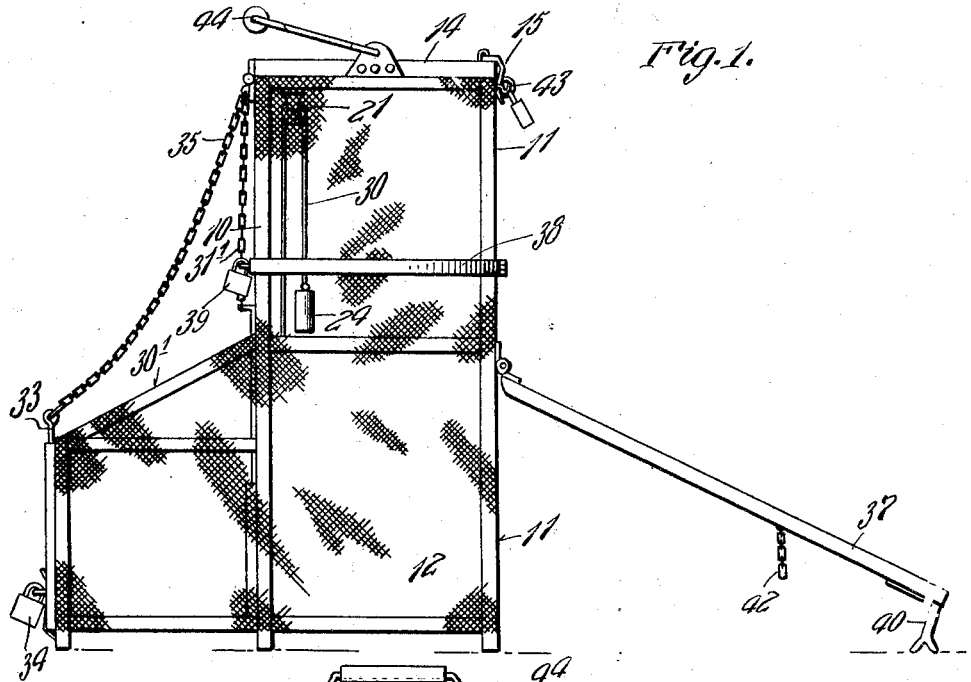
Figure 1 is a front elevation of the trap constructed in accordance with the present invention.
Figure 2:
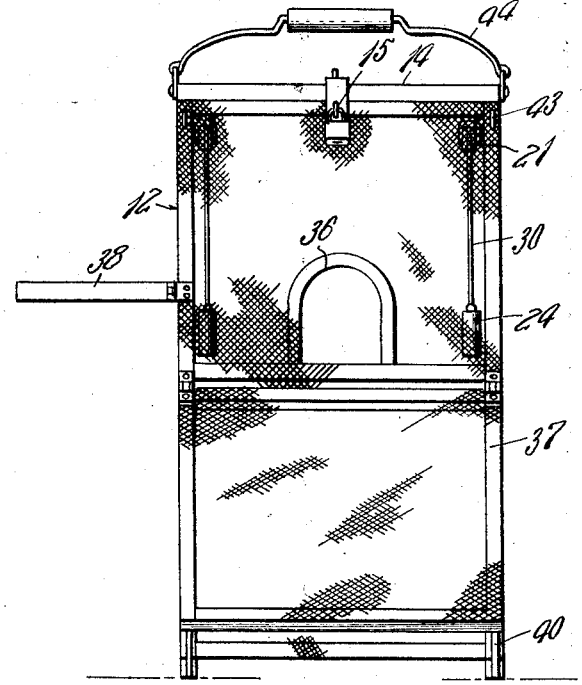
Figure 2 is a side elevation.

The trap forming the subject matter of the present invention may be constructed from any suitable material and also vary in size, without departing from the spirit of the invention. The trap however preferably embodies a frame-like structure covered by foraminated material and includes front and rear walls 10 and 11 respectively connected by side walls 12, a bottom 13 and a hinged cover or top 14. The latter is locked in any suitable manner as at 15 to the rear wall 11. The enclosure defined by these walls is divided into upper and lower compartments 16 and 17 respectively by means of a false bottom 18, the latter being hinged as at 19, and normally held in a horizontal position by means of flexible elements 30 terminally secured to the false bottom and extended upwardly over pulleys 21. These pulleys are journalled in suitable bearings depending from the framelike structure, and the free ends of the cables support weights 24. Also depending from the framelike structure is a bait supporting element 25.

Built upon the front wall 10 of the structure is an additional trapping compartment 26 which has communication with the lower compartment 17 of the trap by means of a door opening 27, this opening being provided with a sliding door 28 which projects through a slot 29 formed in the top wall 30 of the trapping compartment, and is connected with a chain 31 by means of which the sliding door can be conveniently opened. The front wall of this trapping compartment is provided with a door opening 32 normally closed by a door 33, and this door is locked in any suitable manner as at 34. This door is also equipped with a chain 35, so that subsequent to the unlocking of the door, the latter can be conveniently opened, to allow the animal to pass out of the trapping compartment.

The rear wall of the trap is provided with an entrance opening 36 which communicates with the upper compartment 16 of the trap, so that when the animal enters the compartment 16, the animal of necessity steps upon the false bottom which swings downwardly on its pivot, and thereby allows the animal to fall into the lower compartment 17. Hinged on the rear wall of the trap is a runway or platform 37 which can be arranged at the proper inclination with respect to the ground, and over which the animal travels in the direction of the entrance opening 36. It is of course to be understood that the trap can be supported on a tree or any other suitable upright or support, and for this purpose I provide a band 38, one end of which is hinged to the rear wall of the trap, and the other end adapted to be locked to the front wall as at 39, the band being wholly disposed at one side of the trap as shown. The underside of the runway or platform is provided with supporting legs 40. When this runway or platform is not in use it can be swung in parallel relation with the rear wall 11 of the trap and held in this position by means of chains 42 which are adapted to be associated with hook like elements 43 supported by the trap structure. If desired, the trap may be also equipped with a suitable handle 44 so that the trap may be conveniently carried from place to place.

In practice, the animal in an effort to obtain the bait arranged upon the supporting element 25 travels up the runway into the compartment 16 through the entrance opening of the trap, and steps upon the false bottom which gives away and causes the animal to fall into the lower compartment 17. The animal is then allowed to pass from the compartment 17 into the trapping compartment at the front of the trap as long as the door between these compartments is opened. When it is desired to remove the animals from the trapping compartment, the door in the front wall of the compartment 17 is closed so as to prohibit the animals from running into the compartment 17 and the door in the front wall of the trapping compartment opened.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:

In a trap, an enclosure, a false pivoted bottom dividing the closure into upper and lower compartments, a trapping compartment arranged in advance of and communicating with the lower compartment, and including a top wall having a slot therein, a sliding door controlling said communication and movable through said slot whereby said door can be conveniently opened and closed, a chain secured to said door and to the trap structure, the front wall of the trapping compartment having a door opening, a normally closed door for said opening, one wall of the upper compartment having an entrance opening to the trap, a runway pivoted on the trap immediately beneath said entrance opening, and a bait holder arranged within the upper compartment.

In testimony whereof I affix my signature.

STEPHEN M. MAGSBY.